United States Patent
Venkatachalam

(10) Patent No.: US 7,742,013 B2
(45) Date of Patent: Jun. 22, 2010

(54) INTEGRATED SPECTACLES AND DISPLAY UNIT FOR COMPUTERS AND VIDEO

(75) Inventor: Hari Hara Kumar Venkatachalam, 721 Emil Ave., Shoreview, MN (US) 55126

(73) Assignee: Hari Hara Kumar Venkatachalam, Shoreview, MN (US)

( * ) Notice: Subject to any disclaimer, the term of this patent is extended or adjusted under 35 U.S.C. 154(b) by 1392 days.

(21) Appl. No.: 10/672,316

(22) Filed: Sep. 26, 2003

(65) Prior Publication Data

US 2004/0061664 A1    Apr. 1, 2004

Related U.S. Application Data

(60) Provisional application No. 60/413,721, filed on Sep. 26, 2002.

(51) Int. Cl.
    *G09G 5/00* (2006.01)
(52) U.S. Cl. .......................... 345/7; 348/115
(58) Field of Classification Search ............... 345/7–9
    See application file for complete search history.

(56) References Cited

U.S. PATENT DOCUMENTS

| 5,072,209 | A  | * | 12/1991 | Hori et al. ............... 340/432 |
| 5,281,957 | A  | * | 1/1994  | Schoolman ................ 345/8   |
| 5,497,170 | A  | * | 3/1996  | Kato et al. ................ 345/9  |
| 5,656,804 | A  | * | 8/1997  | Barkan et al. .......... 235/472.01 |
| 6,094,283 | A  | * | 7/2000  | Preston ................... 359/15  |
| 6,307,526 | B1 | * | 10/2001 | Mann ..................... 345/8    |
| 6,320,559 | B1 | * | 11/2001 | Yasukawa et al. ......... 345/7    |

* cited by examiner

*Primary Examiner*—Duc Q. Dinh
(74) *Attorney, Agent, or Firm*—Westman, Champlin & Kelly, P.A.; Alan Rego

(57) ABSTRACT

A pair of data-specs is provided. The pair of data-specs includes a pair of spectacles adapted to be worn on the face of a person, and a projection unit coupled to the spectacles. The projection unit is adapted to display data received from a computer, or a television set.

2 Claims, 6 Drawing Sheets

INTEGRATED SPECTACLES AND DISPLAY UNIT FOR COMPUTERS AND VIDEO

CROSS REFERENCE TO RELATED APPLICATION

The present application is based on and claims the benefit of U.S. provisional patent application Ser. No. 60/413,721, filed Sep. 26, 2002, the contents of which are hereby incorporated by reference in its entirety.

FIELD OF THE INVENTION

The present invention generally relates to display units for computers and video systems. More specifically, the present invention relates to integrated spectacles (eye-glasses) and display units for computers and video.

BACKGROUND OF THE INVENTION

Display units are typically used in computer systems, and video systems (such as televisions), to display information—either data or video.

One of the biggest components of a computer or a television is the display unit. It is also the most exposed and fragile component of the computer or video system. Advances in display unit technology have revolved around reducing the size of components and the size of the overall display unit. Smaller display units can allow for a reduction in overall size of computer systems into which display units are installed. With the reduction in the size of the display unit, more space is available within the computer system for other components. In addition to the small display units, the display unit industry has also made advances toward increasing the clarity and portability of individual display units.

In general, current display units are separate pieces of equipment that have to be carried by the user or placed on a desk, for example. The prior art has lacked a simple display unit, which is not a separate piece of equipment.

The present invention addresses these problems and offers other advantages over the prior art.

SUMMARY OF THE INVENTION

A pair of data-specs is provided. The pair of data-specs includes a pair of spectacles, adapted to be worn on the face of a person, and a projection unit coupled to the spectacles. The projection unit is adapted to display data received from a computer or a television set.

BRIEF DESCRIPTION OF THE DRAWINGS

FIG. 1-2 is a simplified block diagram showing a side view of the data-specs.

FIG. 1-3 is a simplified block diagram showing a projection unit of the data-specs shown in FIGS. 1-1 and 1-2.

FIG. 2 is a simplified block diagram illustrating a corded use of the data-specs.

FIG. 3 is a simplified block diagram illustrating a cordless use of the data-specs.

DETAILED DESCRIPTION OF THE PREFERRED EMBODIMENTS

Embodiments of the present invention, described below, relate to a pair of data-specs, which is a projection/display unit that is integrated with a pair of spectacles (eye-glasses).

Figure 1:
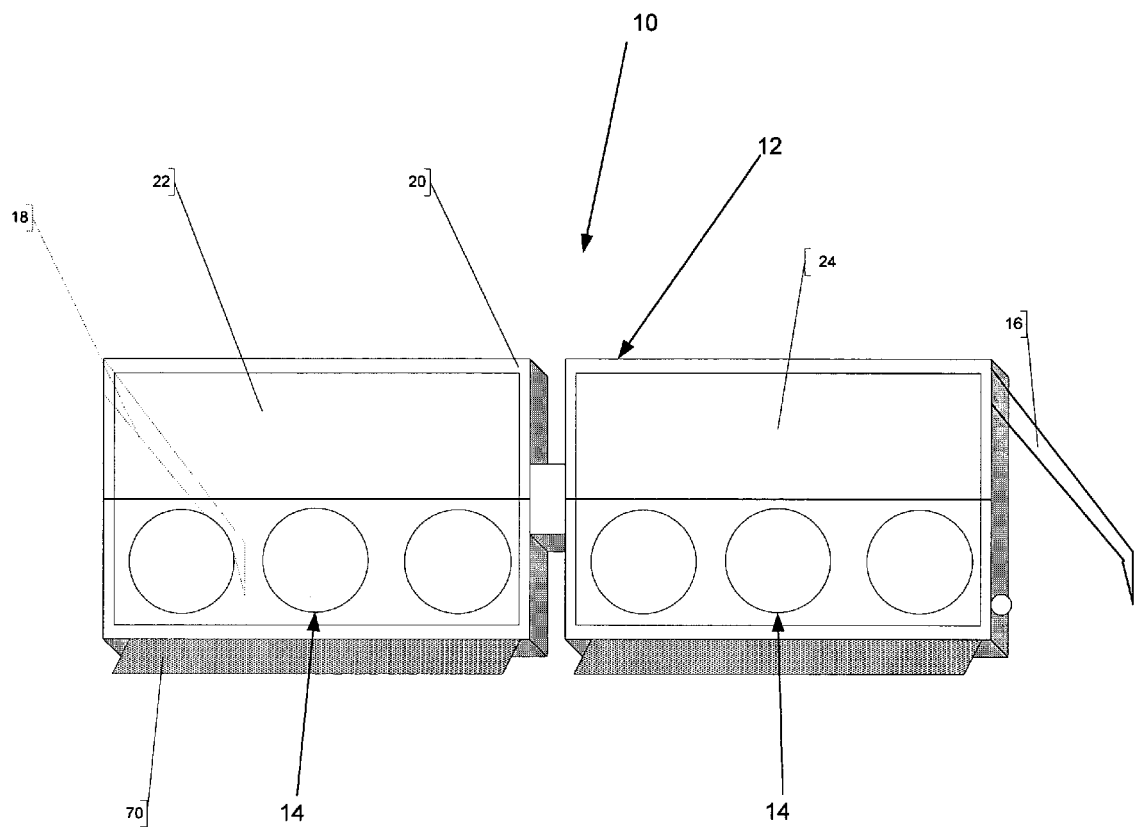
FIG. 1-1 is a simplified block diagram showing a front view of the data-specs in accordance with one embodiment of the present invention.
Figures 1, 2:
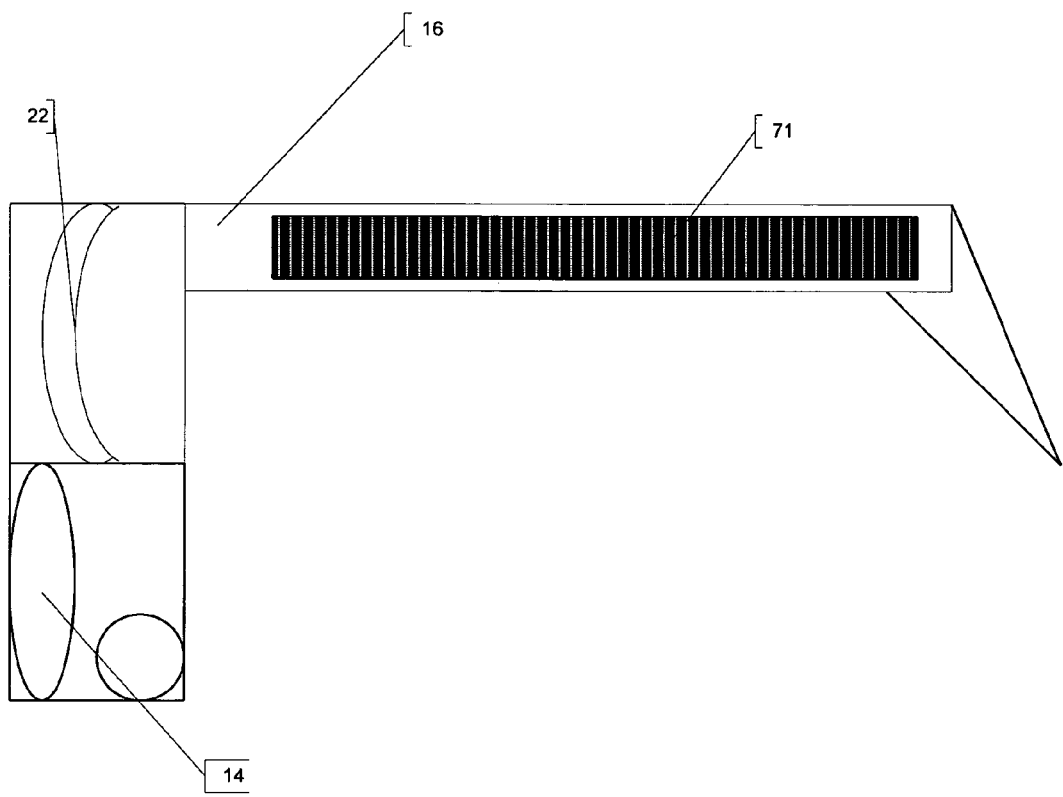

FIG. 1-1 and FIG. 1-2 are simplified block diagrams showing a front view and a side view, respectively, of data-specs 10 in accordance with one embodiment of the present invention. The same reference numerals are used in the different figures to represent the same or similar elements. As can be seen in FIG. 1-1, data-specs 10 include spectacles 12 and projection unit(s) 14. Spectacles 12 and projection unit 14 are integrated. As used herein "integrated" can include a separate projection unit 14 that is attached to the spectacles using any suitable means (for example, any suitable fasteners such as screws, glue, etc.). Spectacles 12 include a first temple 16, a second temple 18, a frame 20, a first lens 22, and a second lens 24. As can be seen in FIG. 1-1, projection unit(s) 14 is preferably positioned towards the bottom of the frame 20.

Data-specs 10 can display video and data aimed at a virtual screen (such as 36 shown in FIG. 1-3), which is either a clear space in front of the user or a wall. Data-specs 10 can be used to display information (data from a computer or video from a television set, for example).

Since this invention (data-specs 10) is wearable, the portability issues associated with traditional display units are solved. It can also serve many purposes, as mentioned above, to act as a computer display unit, or Video Display Unit. Since it has a spectacle component, it can also be used by people who wear prescription lenses.

Figures 1, 2, 3:
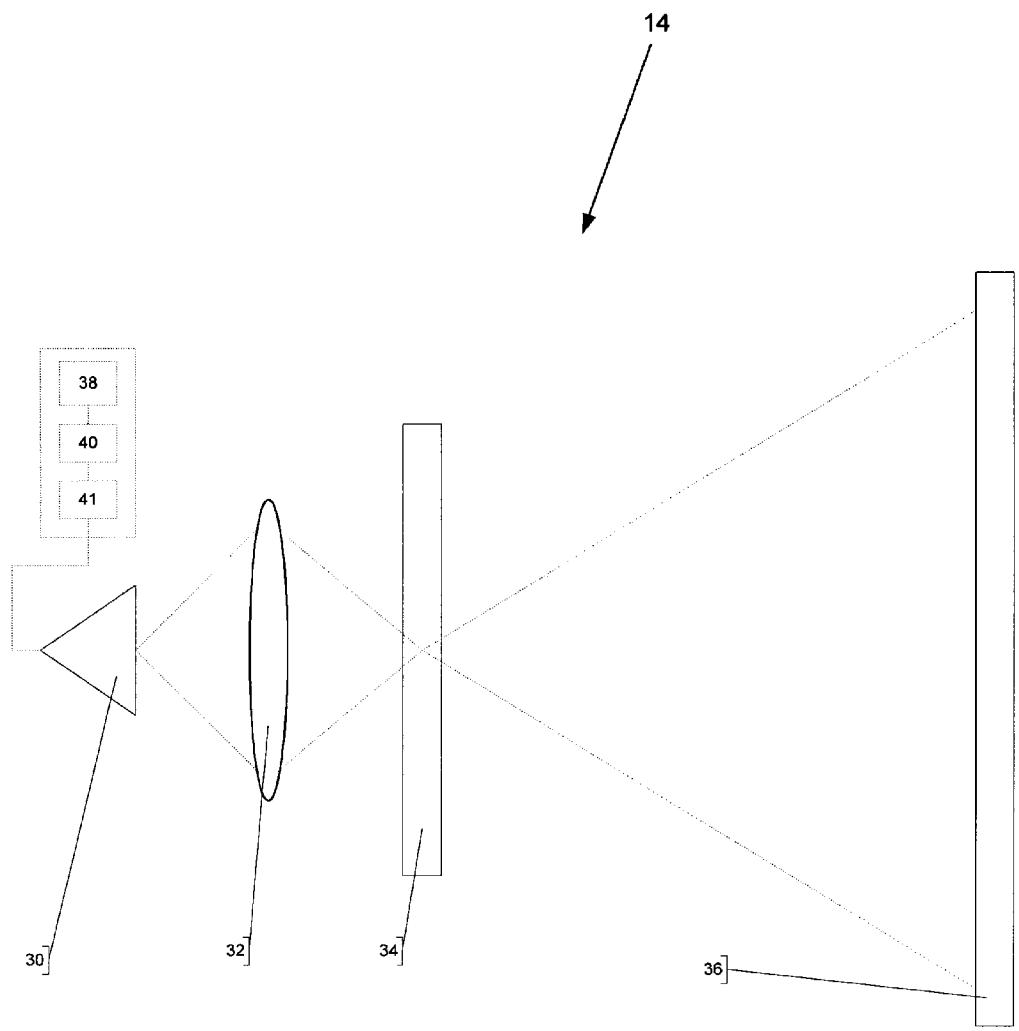
Figure 2:
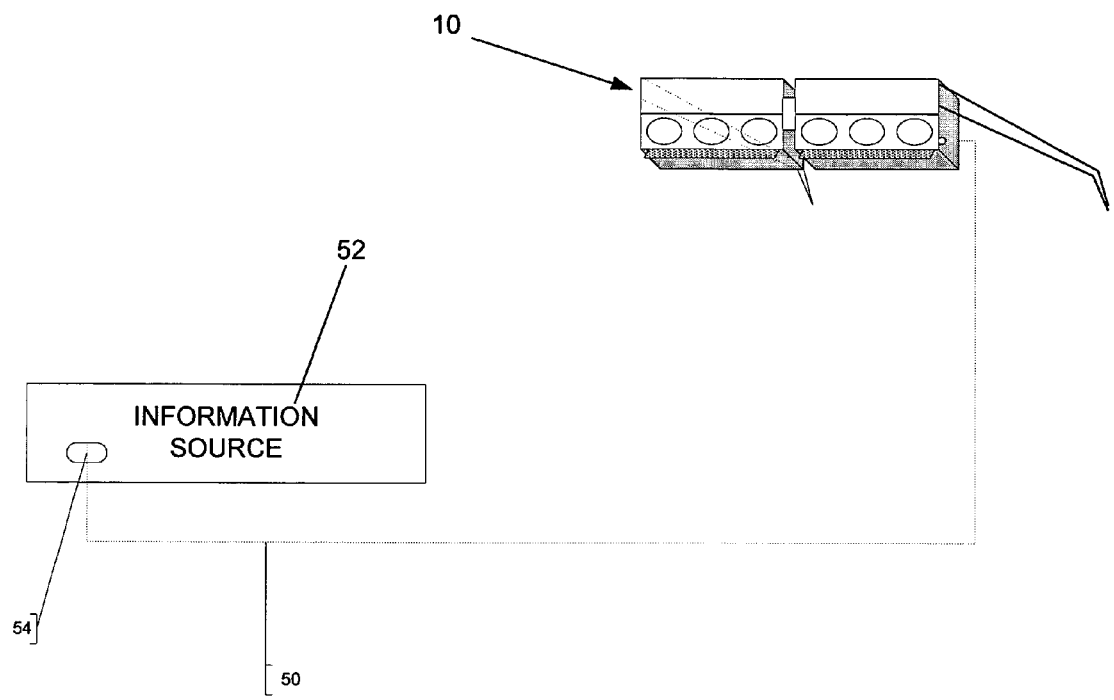
Figure 3:
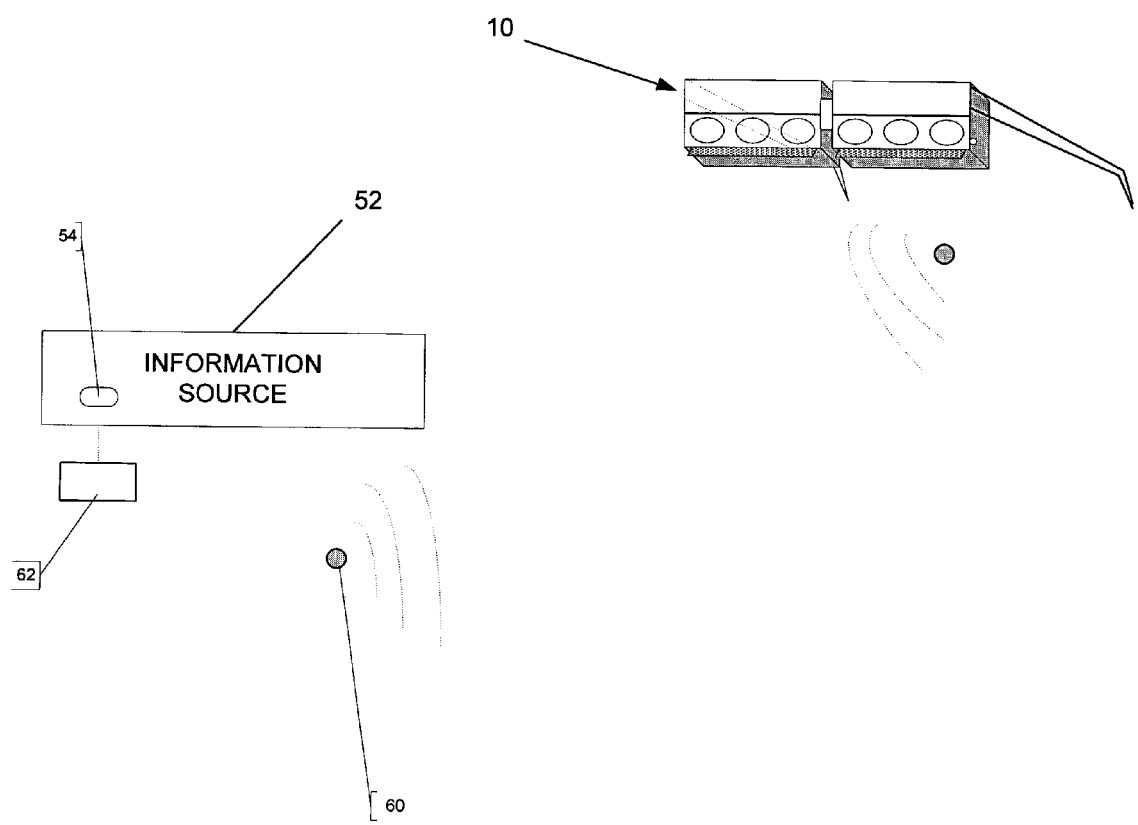

Projection unit 14 may comprise or employ any type of projection technology such as current television projection technology, plasma technology or other projection techniques that are known in the industry or are developed in the future. One example of projection unit 14 is illustrated in FIG. 1-3. As can be seen in FIG. 1-3, projection unit 14 includes a receiver 30, which can be a Cathode Ray Tube (CRT) or Liquid Crystal Display (LCD), a double convex lens 32 and an image-forming display panel 34. Receiver 30 is capable of receiving information from a computer or television through wired or wireless means. In this case, called a front or transmissive projection, the light emanates from the receiver 30, converges onto image-forming display panel 34 through the lens 32. Image-forming display panel 34, in turn, projects the light onto virtual screen 36.

In some embodiments of the present invention, projection unit 14 also includes a motion sensor 38 and a controller 40, which is coupled to motion sensor 38 and to receiver 30. Controller 40, in some embodiments includes any suitable switching mechanism, which is capable of receiving input from the motion sensor 38 and responsively disabling/enabling receiver 30. Specifically, when motion detected by motion sensor 38 is found to be above a pre-determined threshold by controller 40, it provides a shutdown control signal which disables receiver 30. Similarly, when motion detected by motion sensor 38 is found to be below a predetermined threshold by controller 40, it provides a startup/restart control signal which enables receiver 30. Examples of motion sensor 38 include a gyroscope or other conventional motion sensing equipment. In some embodiments, the predetermined threshold is preset to a single value and therefore cannot be adjusted by the user. In other embodiments, controller 40 also includes a memory (not shown) in which multiple motion thresholds are stored. The user can select any one of these thresholds, via an input (not shown) coupled to controller 40.

Communication between the computer or the video system and the data-specs can be carried out either by wired communication (shown in FIG. 2) or wireless communication (shown in FIG. 3). In FIG. 2, an information source (computer, television, etc.) 52 is coupled to data-specs 10 via a wired communication link 50. A first end of wired communication link 50 is configured to couple to an output port 54 of information source 52. A second end of wired communication link 50 is configured to couple to an input port (not shown) of data-specs 10. Wired communication link 50 can be a Universal Serial Bus (USB), Serial port connections, such as RS-232, or any other suitable connection means.

Referring now to FIG. 3, information source 52 coupled to data-specs 10 via wireless communication link 60 is shown. A transmitter 62, which can be either integral with, or separate from information source 52 transmits data from information source 52 to receiver 30 (FIG. 1-3), which is a part of data-specs 10. Wireless communication link 60 can be Radio Frequencies (RF), Very High Frequencies (VHF), Ultra High Frequencies (UHF), etc.

In general, any communication techniques (wired or wireless) known in the industry or those that are developed in the future can be employed to communicate data between information source 52 and data-specs 10, without departing from the spirit or scope of the present invention.

In some embodiments, data-specs 10 also includes a heat deflector 70 (shown in FIG. 1-1) configured to couple to frame 20. Heat deflector 70 can be coupled to frame 20 of data-specs 10 using glue, for example. Heat deflector 70 is included to protect the user from heat which may be generated by projection unit 14 of data-specs 10. Heat deflector 70 may comprise any suitable heat deflecting material that is capable of dissipating heat away from projector 14 of data-specs 10.

In some embodiments, the aspect ratio of the display is 4:3 (for every 4 units of width the display stretches out 3 units of height). In other embodiments, any other industry standard for aspect ratio, such as 16:9 may be employed. It should be noted that the focal length of lens 32 and the size of image-forming display panel 34 determine the size of virtual screen 36. In some embodiments, data-specs 10 will allow a minimum resolution of 640×480 pixels.

It should be noted that projection unit 14 of data-specs 10 also includes power control circuitry 41 (FIG. 1-3). Power control circuitry 41 may include batteries that are capable of providing power to receiver 30, motion sensor 38 and controller 40. In some embodiments that employ wired communication (shown in FIG. 2), power may be provided from information source 52 to the above-mentioned components via power control circuitry 41. In such embodiments, power control circuitry may not include batteries or may include rechargeable batteries, which receive charge from information source 52. Solar power can also be used to power the above-mentioned components of projection unit 14 of data-specs 10. Solar power can be stored in solar cells, which can be included within power control circuitry 41. The solar cells (such as 71 of FIG. 1-2) may be positioned along temples 16 and 18.

The projection unit, heat deflector, data port, receiver, etc., may be positioned anywhere on the spectacles and the drawings illustrate only exemplary embodiments of the present invention.

Figure 4:
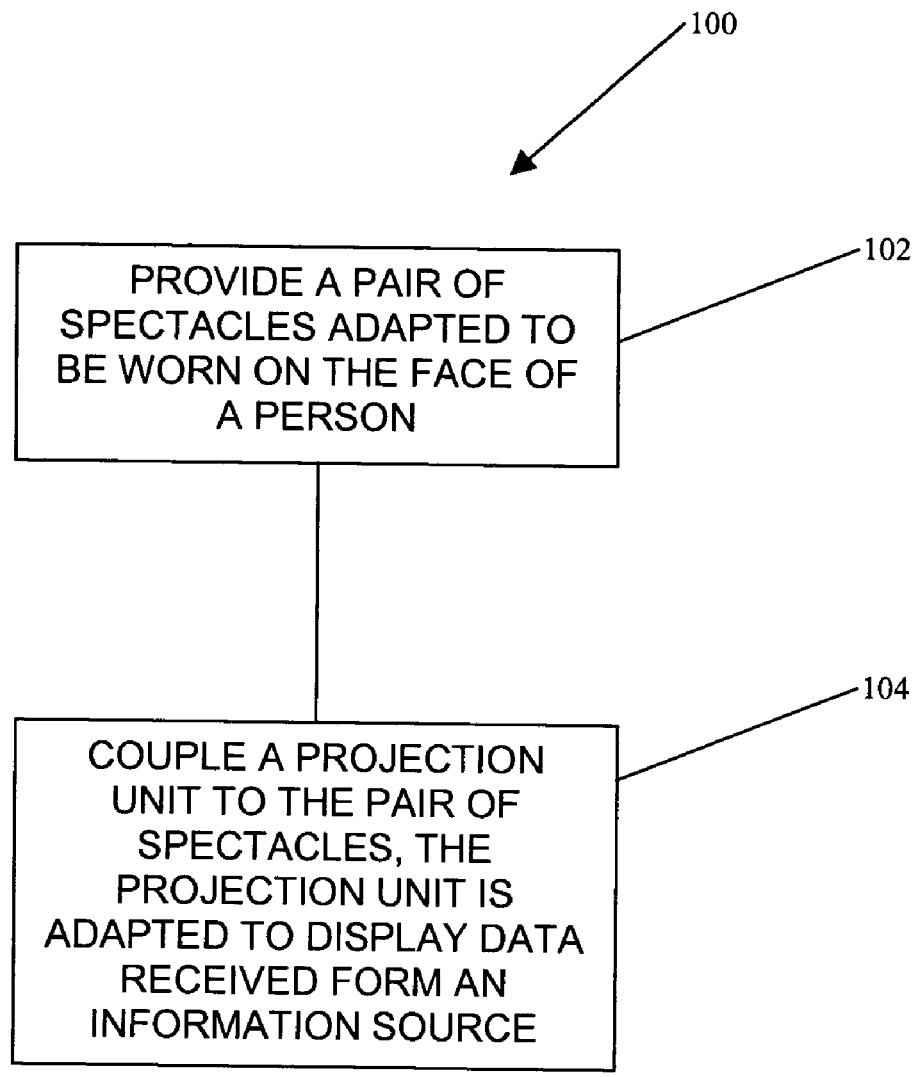
FIG. 4 is a flow chart showing steps of a method of forming a wearable device that displays data from an information source in accordance with an embodiment of the present invention.

FIG. 4 is a flow chart 100 showing steps of a method of forming a wearable device that displays data from an information source in accordance with an embodiment of the present invention. At step 102, a pair of spectacles adapted to be worn on the face of a person is provided. At step 104, a projection unit is coupled to the pair of spectacles. The projection unit is adapted to display data received from an information source. Different techniques, some of which are set forth above, can be employed to carry out the steps shown in the flow chart of FIG. 4 while maintaining substantially the same functionality without departing from the scope and spirit of the present invention.

Although the present invention has been described with reference to preferred embodiments, workers skilled in the art will recognize that changes may be made in form and detail without departing from the spirit and scope of the invention.

What is claimed is:

1. A pair of data-specs comprising:
   a pair of spectacles adapted to be worn on the face of a person, the pair of spectacles having a first lens and a second lens; and
   a projection unit coupled to the spectacles, the projection unit adapted to display data received from an information source,
   wherein the first lens and the second lens are independent of the projection unit, and wherein the projection unit is structurally and functionally application-independent,
   wherein the data that the projection unit is adapted to display includes data from a computer or video from a television set,
   a motion sensor and a controller, the controller is adapted to receive an input from the motion sensor and to responsively disable or enable a receiver of the projection unit,
   wherein the controller is adapted to provide a shutdown control signal to the receiver when motion detected by the motion sensor is found to be above a predetermined threshold.

2. A pair of data-specs comprising:
   a pair of spectacles adapted to be worn on the face of a person, the pair of spectacles having a first lens and a second lens; and
   a projection unit coupled to the spectacles, the projection unit adapted to display data received from an information source,
   wherein the first lens and the second lens are independent of the projection unit, and wherein the projection unit is structurally and functionally application-independent,
   wherein the data that the projection unit is adapted to display includes data from a computer or video from a television set,
   a motion sensor and a controller, the controller is adapted to receive an input from the motion sensor and to responsively disable or enable a receiver of the projection unit,
   wherein the controller is adapted to provide a startup control signal to the receiver when motion detected by the motion sensor is found to be below a predetermined threshold.

* * * * *